(12) United States Patent
Sandler

(10) Patent No.: US 6,245,134 B1
(45) Date of Patent: Jun. 12, 2001

(54) APPARATUS FOR TESTING SYSTEMS DESIGNED FOR $NO_X$ REDUCTION IN THE COMBUSTION OF CARBONACEOUS FUELS

(75) Inventor: Howard E. Sandler, Laguna Hills, CA (US)

(73) Assignee: Hera, LLC, Lake Forest, CA (US)

( * ) Notice: Subject to any disclaimer, the term of this patent is extended or adjusted under 35 U.S.C. 154(b) by 45 days.

(21) Appl. No.: 09/644,036

(22) Filed: Aug. 22, 2000

Related U.S. Application Data

(62) Division of application No. 09/060,944, filed on Apr. 15, 1998, now Pat. No. 6,120,580.

(51) Int. Cl.[7] .................................................. B01D 35/00
(52) U.S. Cl. ............................. 96/417; 422/176; 422/177
(58) Field of Search ............................... 95/3, 11, 12, 2, 95/4, 16, 78, 14, 15, 19, 22, 65; 96/60, 52, 61, 64, 73, 26, 413, 417, 18, 19, 53; 422/177, 176; 110/345, 216, 215; 261/DIG. 9; 423/237, 238, 239.1

(56) References Cited

U.S. PATENT DOCUMENTS

| | | | |
|---|---|---|---|
| 4,119,703 | * | 10/1978 | Nishida et al. ....................... 423/239 |
| 4,208,386 | * | 6/1980 | Arand et al. ......................... 423/235 |
| 4,282,115 | * | 8/1981 | Atsukawa et al. ............... 423/239 X |
| 4,325,924 | * | 4/1982 | Arand et al. ......................... 423/235 |
| 4,602,673 | * | 7/1986 | Michelfelder et al. .......... 422/177 X |
| 4,756,891 | * | 7/1988 | Ohlmeyer et al. .................... 423/239 |
| 5,233,934 | * | 8/1993 | Krigmont et al. .................... 110/345 |
| 5,510,092 | * | 4/1996 | Mansour et al. .................. 423/239.1 |
| 5,538,539 | | 7/1996 | Spokoyny et al. ...................... 96/52 |
| 5,540,755 | | 7/1996 | Spokoyny et al. ....................... 95/3 |
| 6,120,580 | * | 9/2000 | Sandler .................................. 95/11 |

OTHER PUBLICATIONS

Department of Energy, *Project Facts,* "Using Selective Catalytic Reduction to Reduce Nitrogen Oxide Pollutants", pp. 1–4, May 11, 1998.*

Clean Coal Technology Jul. 1997Report titled Control of Nitrogen Oxide Emissions: Selective Catalytic Reduction (SCR)—Co–Authored by The U.S. Department of Energy and Southern Company Services, Inc.

* cited by examiner

*Primary Examiner*—Richard L. Chiesa
(74) *Attorney, Agent, or Firm*—Howard E. Sandler

(57) ABSTRACT

A apparatus for the in-situ predetermination of the effects of NOx reduction systems on selected components. This determination can yield quick, inexpensive and accurate results for a number of characteristics, for example: catalyst longevity; efficiency with differing fuels, in differing locations, and at different temperatures; potential of catalyst poisoning in specific circumstances; ammonia slip considerations; SCR and SNCR interplay, as well as staged NOx reduction design criteria; pressure and blockage considerations; downstream effect on air preheater elements; and more. These determinations can be made in real, or accelerated time. Furthermore, the determinations can be made before any system modifications are made, or to assist in increasing the efficiency of existing systems, or even to assist in predictions of preventive maintenance and associated down time.

13 Claims, 5 Drawing Sheets

US 6,245,134 B1

APPARATUS FOR TESTING SYSTEMS DESIGNED FOR NO$_X$ REDUCTION IN THE COMBUSTION OF CARBONACEOUS FUELS

RELATED APPLICATIONS

This application is a Division of co-pending U.S. application Ser. No. 09/060,944, filed Apr. 15, 1998, now U.S. Pat. No. 6,120,580.

FIELD OF THE INVENTION

Large amounts of fossil fuels such as coal, oil, natural gas, and to some extent, biofuels, are used in power production, industrial processes, and transportation. Due to the increase in the use of these fuels, release of sulfur dioxides, nitrogen oxides, and carbon dioxide gases have also increased. In the atmosphere, these gases disperse widely and contribute to tropospheric photochemical smog, ozone formation, wet and dry acid disposition, stratospheric acid disposition, and the "greenhouse effect". Recently, great interest has been shown in oxides of nitrogen, that is, in nitric oxide (NO) and nitrogen dioxide ($NO_2$), which are jointly termed $NO_x$, because they are pathogenic in humans, animals, and plants, and initiate noxious photochemical processes in the atmosphere.

The present invention relates to aiding in the improvement and implementation of advanced systems for alleviating the $NO_x$ problem when burning carbonaceous fuels, and more particularly, in such improvements when firing large boilers and reducing emissions of nitrogen based pollutants.

BACKGROUND OF THE INVENTION

Different measures are typically used in attempts to control or alleviate $NO_x$, namely the so-called primary and secondary measures. In the primary measures, a number of combustion modifications may be made to reduce $NO_x$ emissions. There are many different possibilities of boiler modifications, such as low excess air, biased burner firing, over-fire air, flue gas recirculation, and the like, as well as any combination of these and other primary modifications.

When the limits of $NO_x$ emissions cannot be met with combustion control only, flue gas treatments systems, so-called secondary, or post-combustion, measures, may have to be implemented. Among these secondary measures, the dominant method in use is selective catalytic reduction (SCR). In many instances, an SCR installation may provide $NO_x$ reduction as high as 80–90%.

In the selective catalytic reduction method the NOx concentration in the flue gas is reduced through injection of ammonia and passing the flue gas through a catalyst. The role of the catalyst and the reaction mechanism results in reduction products of nitrogen and water. The reaction is selective, which means the oxidation of ammonia and sulfur dioxide should not occur.

The efficiency of SCR system is dependent upon several factors, such as $NO_x$ concentration at the inlet of the catalyst, the flue gas temperature and composition, the ratio of ammonia injection to NOx concentration, and catalyst size and properties such as space velocity, catalyst activity, and active area. Furthermore, a number of other factors, such as the chemical formulation of the catalyst, the type and chemical composition of the fuel being burned, addmixtures being used for boiler conditioning or deslagging requirements, ammonia dispensing techniques, and the like, also have very significant effects on the efficiency and life of the catalyst being used in any SCR process.

Looking further at the main characteristics of the design of an SCR system in, for example, a fossil fuel burning power generation plant, as well as problems associated with such designs:

A. Space velocity is considered to be a crucial design parameter in an SCR reactor for it is a measure of the residence time for the flue gas mixture (at selected temperature and pressure), within the volume of the catalyst. Calculation of the required space velocity for a given application takes the following factors into account: required efficiency, catalyst activity, temperature, permissible ammonia slip, flue gas analysis and dust composition. Without the means for the quick, efficient and inexpensive field verification of the theoretical predictions of required space velocity, very disappointing operational problems, with resultant potential deleterious environmental impacts, were all too often the norm, rather than the exception, when relying upon theory only.

B. The selectivity of the catalyst defines the extent to which the desired reactions occur. A decrease in selectivity allows unwanted reactions such as the oxidation of sulphur dioxide to sulphur trioxide to occur. The oxidation of sulphur dioxide to sulphur trioxide depends mainly on the properties of the catalyst and the flue gas temperature. The actual amount of sulphur trioxide produced depends also on the original concentration of sulphur dioxide in the flue gas. More active catalysts with a lower specific volume lead to a higher rate of sulphur oxidation. The reaction, however, is temperature dependent. Most SCR plants have a guaranteed value for the maximum permitted sulphur dioxide oxidation at a specific flue gas temperature. The ability to make this guarantee is dependent, to a large extent, upon modeling and empirical assumptions, and it is not until the invention described herein, that these assumptions can be rapidly, economically and accurately proved on site, under actual operating conditions.

C. Unreacted ammonia used in an SCR process will react with sulphur trioxide in the presence of water. The result depends on the concentration of ammonia and sulphur trioxide and flue gas temperature. This unwanted product is ammonium bisulfate ($NH_4HSO_4$), a sticky compound which can cause fouling and blocking of equipment downstream in the flue gas flow. This fouling problem may be particularly acute at the cold and intermediate layers of air preheaters. This problem may also be present in known SNCR type applications, depending upon the degree of ammonia slip, natural $SO_3$ concentration in the flue gas flow the temperature of the flue gas, as it passes through the air preheater. The importance of this latter statement will become more apparent after a reading of the following detailed description.

D. Location of the catalyst in the duct may be particularly critical. For example, in a high dust applications, the catalyst is usually placed where the flue gas temperature is right for most types of catalyst, between the economizer and the air preheater. The flue gas passing through the catalyst contains most of the fly ash and sulphur oxides from combustion. Depending upon design criteria, this can cause degradation of the catalyst leading to premature and/or permanent decrease in NOx reduction efficiency. Because of the problems associated with high dust locations, along with the benefits often present in these locations, several changes have been considered in the past when retrofitting a high dust location SCR; however, in many of these instances, such changes were made with only empirical input, or with actual full scale installations. By means of the present invention, as will be described hereinafter, the designer will have many choices to investigate and will be able to quickly, economically and accurately obtain real time and/or accelerated results in actual field conditions.

E. In very rare occasions, an SCR system may be located in a low dust condition situated after a hot gas precipitator and before the air preheater. The flue gas reaching the catalyst is almost dust free, but contains sulfur dioxide, with the attendant effects discussed herinabove insolar as the formation of $NH_4HSO_4$. Hot side precipitators have lost much favor in the United States; however, they are still being installed in Japan. The present invention will permit the field testing of the validity of considering SCR at a low dust condition following a hot side precipitator.

F. Tail end SCR systems have the catalyst situated in the end of the chain of flue gas cleaning equipment, or after the desulphurization plant. The flue gases reaching the catalyst therefore contain only small amounts of sulphur oxides and particulates. The flue gas temperature after the desulphurization plant is too low for most types of catalyst, so reheating is needed. This sort of facility is very rare; however, even if used, the simple testing method and apparatus of the present invention will be invaluable in choosing catalyst, determining the amount of reheating necessary, and verifying other design considerations.

G. Catalysts, for example ones used for coal-fired plants, are designed mainly for parallel flow and can be characterized as one of two primary types, plates or extruded, in any of several configurations, including honeycomb (both of which are referred to hereinafter as expanded surfaces, as are other types which may be envisioned being used in these types of applications, for example molded surfaces of a composite material). The selection of the catalyst geometry is critical depending upon the operating conditions, the type of coal being burned, the number of catalyst layers and the like. Heretofore this selection has been mathematically simulated, often supplemented with mock tests, or physical scale modeling. By means of this invention, the performance and longevity of a number of catalyst structures can be economically, efficiently and accurately tested side by side, in actual field conditions, either in real time, or accelerated.

H. The chemical composition of the catalyst used in SCR systems of the type discussed is determined by a number of criteria, for example: the flue gas temperature; $NO_x$ reduction required; permissible ammonia slip; permissible oxidation of sulphur dioxide; concentration of pollutants in the inlet flue gas and homogeneity of the flue gas flow and guaranteed lifetime of the catalyst. These criteria are perhaps the most onerous to determine accurately in theoretically differing circumstances, and often lead the decision maker to have to grant a contract to the catalyst manufacturer willing to "gamble" the most, rather than the one who has the longest lasting, least expensive, and/or most efficient catalyst. By means of the present invention, claims of various manufacturers can be readily determined, in side by side actual field tests, at a very attractive cost/benefit ratio and, if desired, with accelerated results.

SUMMARY OF THE INVENTION

The reduction of $NO_x$ through the use of SCR remains one of the foremost methods used today. Unfortunately, although any number of tests and installations reported in papers, conferences and technical dissertations, along with computer and physical modeling, and the like, have been devoted to this very important environmental and economic problem, the fact remains that, to a great extent, the choice of proper catalyst, substrate, location, orientation, and composition, is very site specific, and the academic considerations are, unfortunately, only a guess at what will actually occur in a real operating environment. It is to eliminate or, in the least, alleviate this inexactness that the present invention is directed. In the past, attempts to provide similar testing included very expensive and clumsy slip stream arrangements, with limited ability to exactly replicate actual in-duct conditions, or conditions at differing locations or meaningful accelerated effects of passage of time.

By means of the present invention, which includes a simple compact testing module, which is adapted to be tuned to use real or anticipated primary duct conditions, and inserted in such ducts in a manner to gather signals indicative of any variety of relevant factors and operating conditions (i.e. temperature, pressure drop, catalyst efficiency, ammonia slip, blockage, degradation, catalyst poisoning, and the like), at any number of locations, and without requiring boiler downtime, the herein above mentioned prediction and failures problems are overcome or, in the least, greatly alleviated. Furthermore, the invention permits running side by side tests, in one or several locations within the primary exhaust gas stream (i.e. all of such locations being hereinafter collectively referred to as in-duct, unless otherwise specified). Also, the invention herein provides means for better assuring measurement, assuring that the in-duct tests will indeed replicate expanded, higher and/or lower velocity conditions, through the use of means to control the flue gas flow through the module, and to insure steady state conditions at the selected level.

As an additional feature of the present invention, it is to be understood and appreciated that the invention herein is extremely useful in determining the desirability of whether or not to add banks of SCR catalyst to a previous control scheme which employed selective non-catalytic reduction (SNCR), or even in addition to existing banks of SCR.

From a reading of the description hereinabove, and a considerations of the detailed description and drawings hereinafter, it will become readily apparent to one skilled in the art, that the advantages of the present invention over the prior mathematical assumptions, shop modeling, large scale modeling, and the like, are staggering, and the above descriptions only addresses a few main areas. In this regard, the following bullet points will reiterate and expand the distinct advantages discussed above; however, under no circumstances are these bullet point summaries to be considered as exclusive applications and advantages of the present invention, which are only to be defined by the scope of the claims set forth hereinafter:

Performance Improvement—the actual operational testing afforded by the present invention will aid in verifying and optimizing efficiency vis a vis effect of flue gas and fly ash compositions, effect of distribution (flow, temperature, ammonia, $NO_x$), simultaneous activity under real conditions of a number of factors such as location, sizing and type of substrate, variable loading cycling, and the like.

Life Expectancy—the testing procedure of the present invention will readily identify potential seriousness, and/or timing of catalyst masking, catalyst poisoning, catalyst erosion, effect of water/vapor, problems with trace elements, cleanability, effect of additives, ambient problems (i.e. salt in the air), results of attempts of optimization of other portions of the plant, and the like.

Balance of Plant Impact—the testing taught by the present invention will greatly assist in developing economic schemes to alleviate pluggage, ammonia slip from SCR and/or SNCR, with or without SCR, the ability to use and the effectiveness of ammonia destruction catalyst, air preheater effects, predictions on the ability to market the ash, and the like.

Modeling—Modeling results will become much more reliable, nomographs may be developed in certain circumstances, particulate projectory patterns will be simpler to model and estimate, math assumptions can be validated to a much greater degree of accuracy, and the like.

These and other objects and advantages of the present invention will become more readily apparent upon a reading of the following description and drawings, in which:

DETAILED DESCRIPTION

Figure 1:
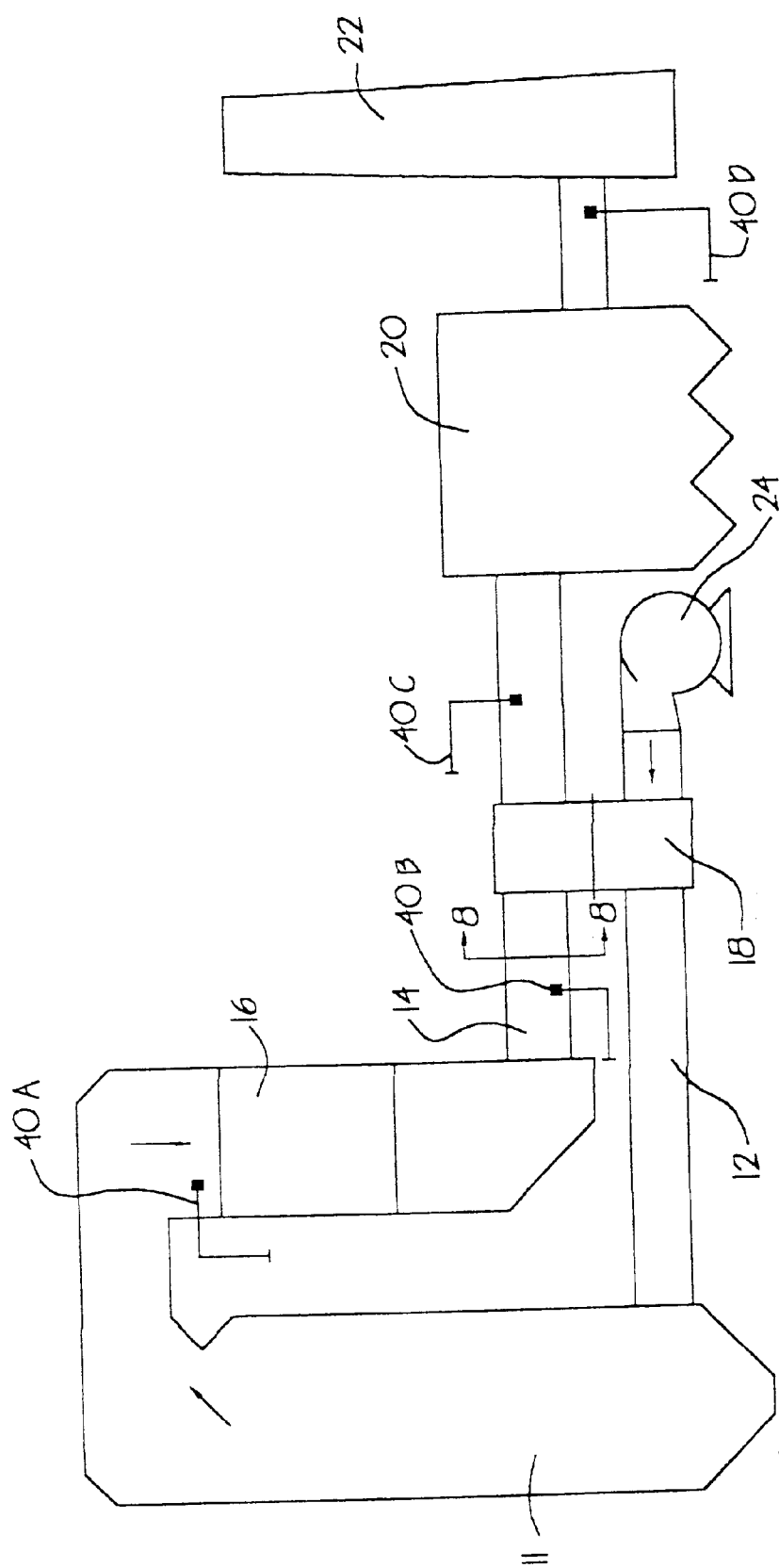
FIG. 1 is a schematic representation of a typical fossil fuel burning facility, without either SNCR or SCR systems, which illustrates the possible areas of inclusion of testing modules of the present invention in exemplary operational positions.

Referring now to FIG. 1 there is schematically illustrated therein a power generation assembly 10, wherein fossil fuel, such as coal is burned in a boiler 11, for generating power. As illustrated, assembly 10 includes a blower 24 for delivering combustion air, via inlet duct 12, to the boiler 11. Fossil fuel is burned within the boiler 11, which produces a flue gas containing $NO_x$, and other contaminants therewithin. The flue gas flows from the boiler 11, which typically includes an economizer section 16, through an exhaust duct 14, to a typical air preheater arrangement 18 and thence to an air cleaning arrangement for removing flyash and other contaminants, for example an electrostatic precipitator generally indicated at 20. The "cleansed" flue gas then is discharged into the atmosphere via an exhaust stack 22.

The combustion of fossil fuels produces a number of contaminants which must be addressed; however, for purposes of this invention, the discussion hereinafter will be primarily directed to $NO_x$ reduction. The reduction of $NO_x$ from stationary sources has become a critical issue in most industrialized nations. As a result, the technology associated with the control of nitrogen oxides ($NO_x$) from fossil-fuel fired generators has matured and expanded significantly.

As mentioned hereinbefore, $NO_x$ reduction processes are available through in-furnace $NO_x$ control (i.e. over,-fire air, gas recirculation, reduced-excess firing, gas mixing, low-$NO_x$ concentric tangential firing, staged combustion, fluidized-bed firing, and the like). In addition to such so called "in-furnace" techniques, many secondary measures of $NO_x$ control have been attempted, the principal secondary measures being selective catalytic reduction (SCR) and selective non-catalytic reduction (SNCR). As is known, the SCR system uses catalyst and a reductant (ammonia) to convert $NO_x$ to nitrogen gas and water vapor. The SNCR system does not require a catalyst for it is operative within a boiler at a much higher temperature range and, can use UREA, ammonia, or some other sort of nitrogenous compound as a starting reagent, without the need of a catalyst to promote the reaction.

Figure 2:
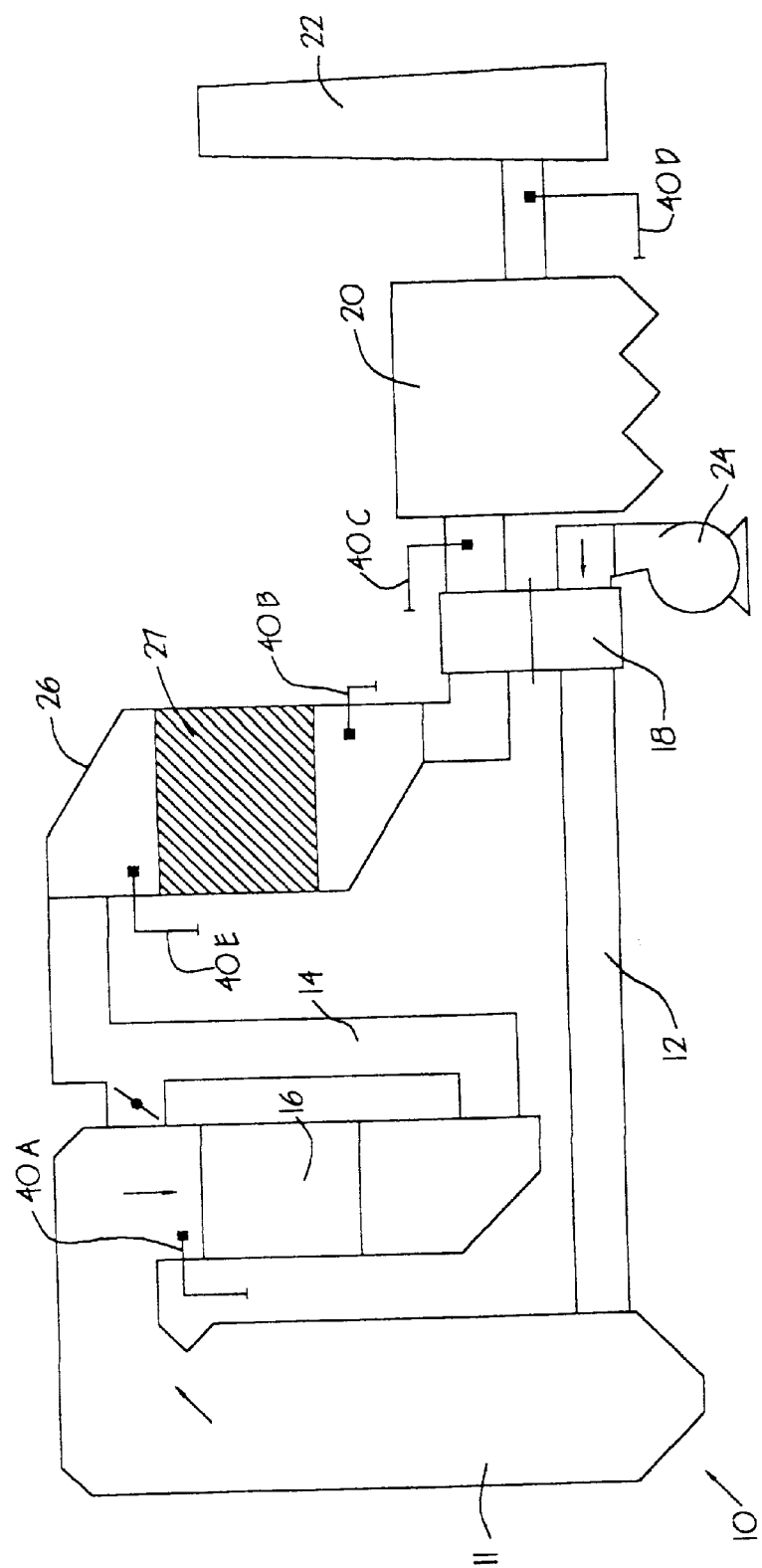
FIG. 2 is a schematic representation of a typical fossil fuel burning facility, of the type indicated in FIG. 1, but which includes a "Conventional" SCR system incorporated therein, and which also illustrates possible areas of inclusion of testing modules of the present invention in exemplary operational positions.
Figure 3:
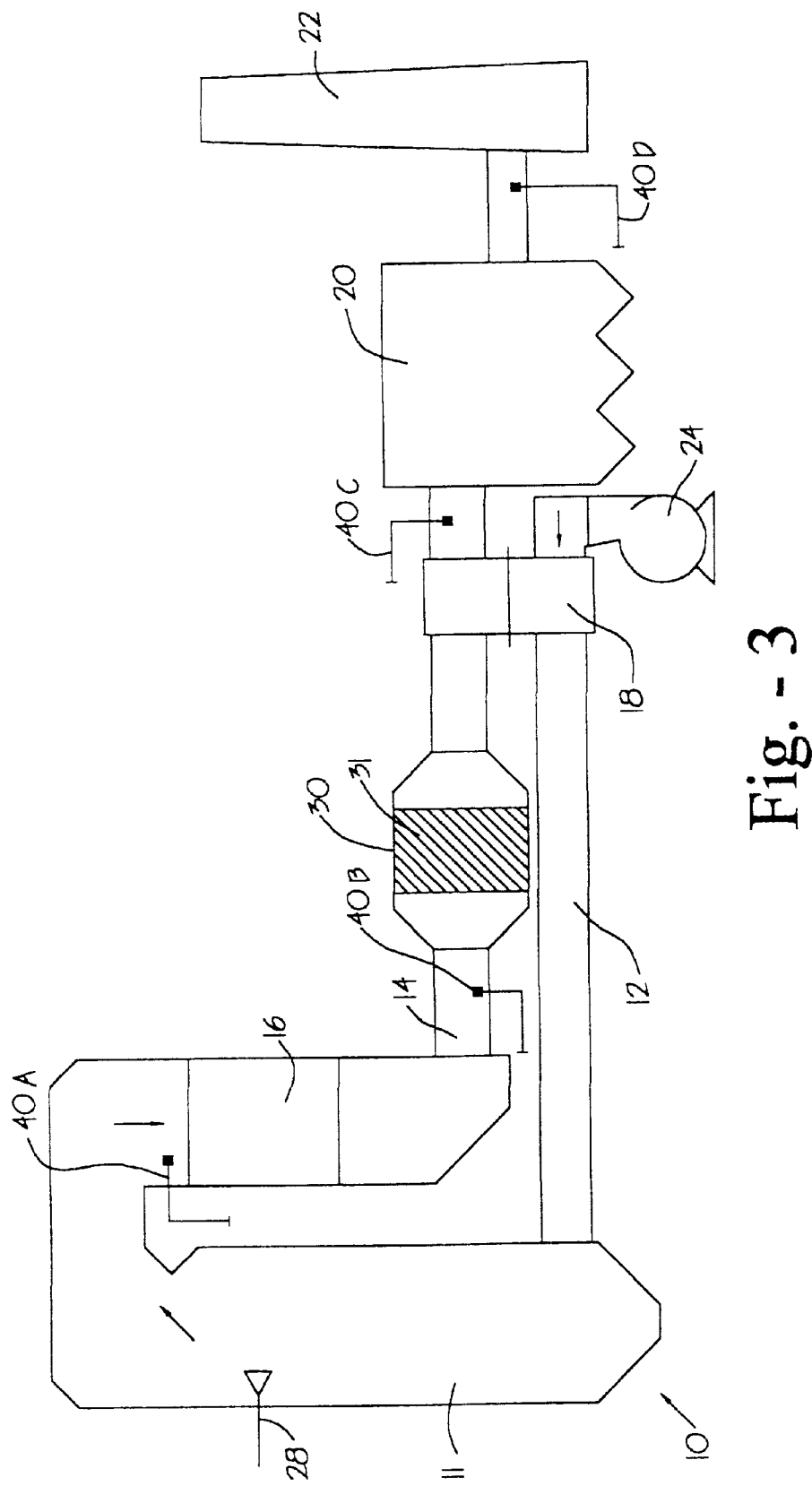
FIG. 3 is a schematic representation of a fossil fuel burning facility, also of the type indicted in FIG. 1, but which includes a hybrid $NO_x$ system (i.e. SNCR in conjunction with in-line SCR and/or one or more non-conventional alternative SCR sections) and which additionally illustrates the possible areas of inclusion of testing modules of the present invention in exemplary operational positions.

FIG. 2 illustrates one type of a power generation system 10', showing a traditional attempt at secondary $NO_x$ control, wherein, normally after the economizer section, a very large SCR section 26 is provided. FIG. 3 illustrates a power generation system 10', having a different approach to secondary $NO_x$ control, which may include an in-duct SCR section 30, an SNCR section, generally indicated at 28, which may, if desired be used alone or in combination with each other, and/or the more traditional SCR assembly 26. Furthermore, if desired, additional SCR can be provided by catalyzing some of the elements of the heat transfer baskets (not shown) of the air preheater 18 and also, if desired, by catalyzng sections (not shown) of the electrostatic precipitator 20.

At this point it is to be noted that the primary feature of the invention herein does not reside in using any particular type of catalyst, or SCR or SNCR arrangement, or of specifics of final systems ammonia grid injections or use of urea, or positioning or these various elements, all of which are well discussed in the art. In this regard, the reader may wish to refer to U.S. Pat. Nos. 4,208,386 and 4,325,924 for SNCR systems, to U.S. Pat. Nos. 4,282,115 and 4,119,703 for typical SCR systems, to U.S. Pat. Nos. 5,233,934 and 5,510,092 for staged systems, and to U.S. Pat. Nos. 4,602,673 and 4,756,891 for SCR systems primarily concerned with catalyzing portions of air preheater or electrostatic precipitator elements. It is to be understood that the discussion of the power plant hereinabove is intended to be highly schematic in nature and is setforth in sufficient detail only as is necessary to understand, practice and enable the present invention. In an operating power plant there are typically many other systems, as well as alternative systems, that are not illustrated in this application; however, the present invention is compatible with such other systems, as will be recognized by those skilled in the art.

Numerous articles, books, computer programs, and other sources are readily available to those skilled in the art which discuss catalyst placement and temperature considerations, destruction and longevity criteria, catalyst poisoning considerations, usage of combination arrangements, and the like. Indeed, it is to this very large number of choices, alternatives, and combinations that the invention herein is directed. By use of this invention, the decision making process, will be greatly simplified, as will estimates on life expectancy, risk-reward considerations, reasonable guarantee requirements, drafting of reasonable legislation, aiding in developing standard approaches to this very important field and the like.

As further examples of the selection criteria used hereinbefore: the pure mathematical approach, while exacting insofar as the manipulation of numbers, may be very inexact insofar as taking into account actual operating criterial and assumption deficiencies; flow modeling tests using three-dimensional models to $\frac{1}{16}$ scale or larger may be of significant help in developing location criteria, however, they are of only limited assistance when predicting the actual operating conditions of catalyst under a number of various conditions such temperatures, locations, fuels, and the like; and utilization of major slip stream analysis, such as illustrated in Topical Report No. 9, issued in July 1997 by The U.S. Department of Energy and Southern Research Company Services, Inc., and titled "Coal Technology—Control of Nitrogen Oxide Emissions: Selective Catalytic Reduction (SCR)", while interesting from an overall theoretical standpoint, such an arrangement is extremely expensive and grossly inflexible for rapid analysis of varied conditions. In addition to the exemplary problems described above with respect to obtaining valid bases for predictions, none of such prior method can easily, inexpensively and consistently replicate the actual operating conditions within the portion of the duct being considered, nor are they appropriate for obtaining predictions of accelerated operations, which are to reflect, with a great degree of certainty, actual conditions.

Figure 5:
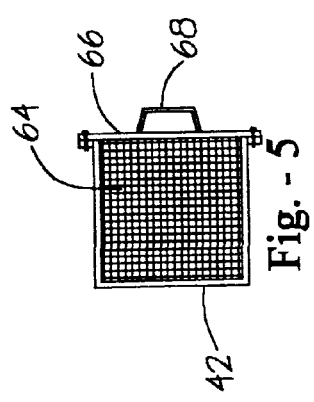
FIG. 5 is a cross-sectional view taken on lines 5—5 of FIG. 4, and which illustrates a section through the catalyst insert of the testing module of FIG. 4.
Figure 4:
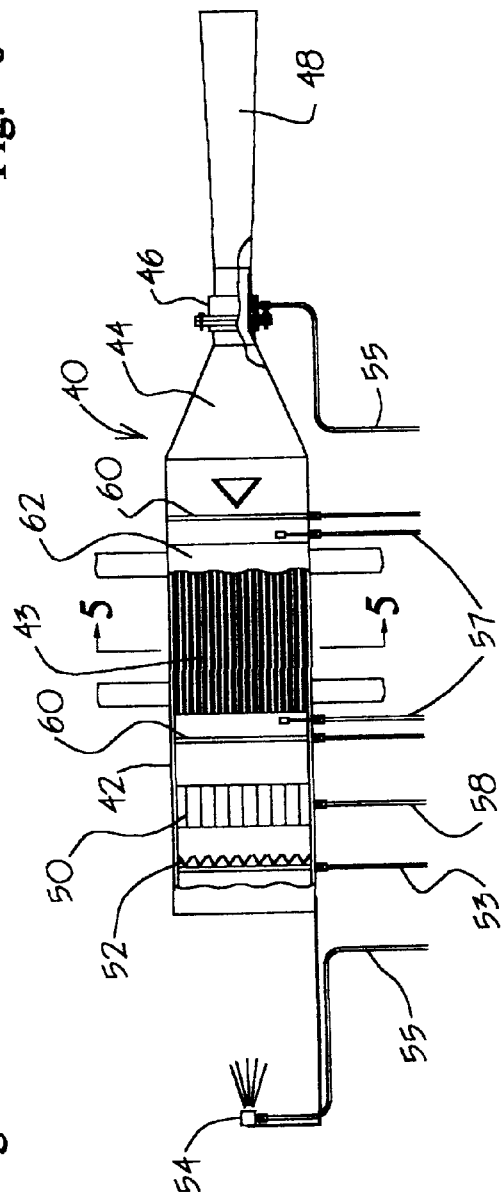
FIG. 4 is a side elevational view, partially in section, of one embodiment of a test module constructed in accordance with the principles of the present invention.

FIG. 4 illustrates an exemplary preferred embodiment of a test module assembly 40 of the present invention and, as shown, comprises: a body member 42 having upstream and downstream axially spaced ends thereof (upstream and downstream to be understood to be referenced to the direction of flue gas flow when the modules are located in operable positions), a testing module section 43 located intermediate the axial ends of body member 42; and a suitable air enhancement means (shown as a conical transition section 44, which tapers inwardly towards its downstream side, at which point a flow adjustment means, such as an air amplifier or aspirator means 46, is suitably positioned to enhance the flow of flue gas through the test module assembly 40). The amplifier 46 may be of any suitable type and, as shown, includes an extension section 48. There are a number of known devices which are suitable for use to induce or cause aspiration of a portion of the flue gas flow through the test module 40 (i.e. ejectors, eductors, coandas, air amplifiers, vacuum transducers, and the like). The applicant favors a compressed air or steam fed aspirating means for the amplifier 46 and in the embodiment illustrated an amplifier extension 48 is desired for better control and an improved amplification ratio. At this point it is to be also noted that, as best schematically illustrated in FIG. 5, the testing module sections is fitted with a suitable door, shown as a flanged plate 66, having a handle 68 thereon, to facilitate the insertion and removal of the test module 43 (in the embodiment illustrated, the test module is illustrated as a honey-comb type catalyst module).

The purpose behind the invention herein is to provide a method and apparatus which will permit in-situ testing of components which may be affected by various NOx control schemes. In most instances, this testing will be of catalyst modules; however, in some instances, other components will be tested, for example, simple non-catalyzed substrate, or air heater elements, either catalyzed or non-catalyzed. Accordingly, the method and apparatus of the invention herein is preferably designed to permit the greatest degree of latitude. Nevertheless, in most instances, the flow through the test module 40 should emulate actual flow through the duct portion in which the full conventional or in-duct catalyst will be positioned. In instances, such as in FIG. 1, where a module 40 is positioned in an unexpanded duct section, which currently has no operational catalyst modules therewithin (but which is intended to be enlarged, and have catalyst sections, for example catalyzed honeycomb modules), the test module method and apparatus must take into account the actual differences in velocity because of design changes, temperature variations which may occur, known aerosol sampling considerations (i.e. the aerosol sampling rate should not be too high or too low to replicate actual anticipated conditions). In most cases, the flow velocities through the sample catalyst 64, or other element being tested, should be the same as the velocity of the flue gas passing in a reconstructed duct with a full operational SCR system. This requirement, to be able to replicate actual future conditions, is one of the primary reasons for the amplifier 46. Indeed, in many instances the actual natural velocity through the test module will be much different from the velocity through the "clear" duct and the reconstructed "SCR" carrying duct. Amplifier 46 will be required to secure the velocity of the flue gas stream through the test module 40, which, depending upon conditions and test requirements might be higher or lower than the existing flue gas velocity at the test location.

A still further object of the present invention is to be able to provide in-situ accelerated testing. In other words, through the use of the present invention, with the many adjustments possible, by accelerating the flow, while simultaneously insuring that ash concentration or uncertain abrasion does not occur to the sample being tested, a test which might take many months with other forms of investigations, may be able to be accelerated to only a few weeks, and with results scaled with a very acceptable degree of accuracy.

As mentioned hereinbefore, there is an absolute necessity to have the ability to readily test the same or differing catalyst is a number of areas, and examples of such areas are illustrated at 40A through 40E in the figures. The areas may be selected for any number of criteria (i.e. perceive ash concentration, temperature of the flue gas, flow characteristics and distribution in the duct, size the honeycomb; velocity warranties of the manufacturer; and the like). Further, in instances, such as in FIG. 3, where SNCR is illustrated to already exist, it is most desirable to determine if the addition of downstream SCR, or perhaps an ammonia destruction catalyst will beneficially enhance the usage of the SNCR system.

Figure 6:
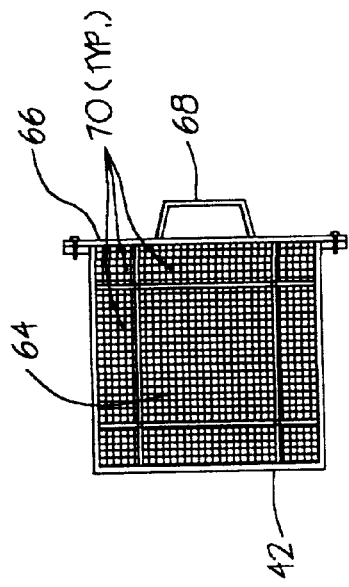
FIG. 6 is a cross-sectional view similar to that to FIG. 5, but which illustrates different embodiment of a catalyst insert.
Figure 7:
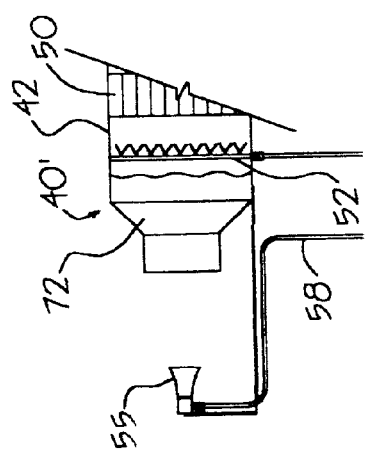
FIG. 7 is an partial side elevational view of another embodiment of test module of the present invention, which includes a means adjacent the upstream end for reducing the velocity of the gas passing there through, and also which schematically illustrates another type of cleaning device, in this particular instance, an acoustic unit, rather than a soot blowing type cleaning device.

Other refinements of the test module assembly 40 can be readily seen in FIGS. 4, 6 and 7. In this regard, attention is drawn to the schematic representation of an ammonia injection grid 52, which is illustrated as being fed through a supply conduit 53. The supply conduit 53 will be connected to a variable volume supply source (not shown), so that the same or differing catalyst may be tested with differing amounts of ammonia, or some other sort of compound. Indeed, in some instances the testing may be directed to pluggage from some other type of additives, and its resultant effect on samples being tested. At this point it is to be noted that the module assembly of the present invention may also be used just downstream of an air preheater, and the sampling therewithin could determine pluggage to various types of air preheater elements, caused by future ammonia slip from SNCR and/or SCR systems. Furthermore, the invention herein envisions being able to modulate the temperature of the flue gas passing by the module to model the temperature of the different layers of the air preheater.

The development of the chemical composition of catalyst, as well as the design of it expanded substrate is difficult at best, and often requires guesses, of the type which very knowledgeable scientists and engineers may be directly opposite in their views. The test modules of the present invention can settle these differences between science and art, and perhaps assist in developing a much more sound scientific approach, applicable to different circumstances. In this regard, the module 40 of the present invention also includes inlet and outlet side temperature and pressure indicators, commonly illustrated at 57. Gas sample probes 62 are also included. Such an arrangement will provide accurate in-situ operating data, to make the selection of new or modified SCR and/or SNCR much more simplified and much less risky. Side by side tests are simple, inexpensive, and totally accurate under the same representative conditions.

The invention herein also considers the necessity of having all available means to design conditions which will replicate full scale assemblies and, in this regard, the element represented by the numeral 50 is included to indicate the potential usage of flow straighteners, static mixing, and/or heater sections. As to the heater sections, there may be many instances to vary the temperature of the flue gas flow passing to the sample to indicate full or partial loads, and, in the instance of testing heater elements, to replicate conditions at the intermediate or cold end layer of heater baskets. The line marked with the numeral 58 is indicative of a an electrical source of heating of the flue gas flow before it passes through the catalyst sample.

FIG. 6 includes a number of catalyst fill sections, 70, arranged intermediate the outer periphery of the in-situ SCR section 62, and the adjacent inner periphery of the sample body portion 62. This arrangement will better insure that the actual flue gas flow through the SCR catalyst module will more likely replicate actual conditions of the rebuilt or altered duct sections. Even physical separation of the sections 70 from the section 62 may be suggested on occasion to better insure accurate indications of actual conditions in the target conditions.

Referring now to FIGS. 4 and 7, there are shown means for cleaning the test module in operation: in FIG. 4 through the use of a known type of soot blower 54; and in FIG. 7, through the use of an acoustic horn 55. FIG. 7 also illustrates a velocity reducer section 72, which may be necessary to reduce the velocity of the flue gas passing through the test module to better replicate anticipated operating conditions. The velocity reducer section 72 may be of any suitable type, and may be releasably attached to the body member 42 in any suitable manner (i.e. threaded, flanged or overlapped arrangements, or the like); however, for additional flexibility, an adjustable reducing arrangement is also anticipated.

Figure 8:
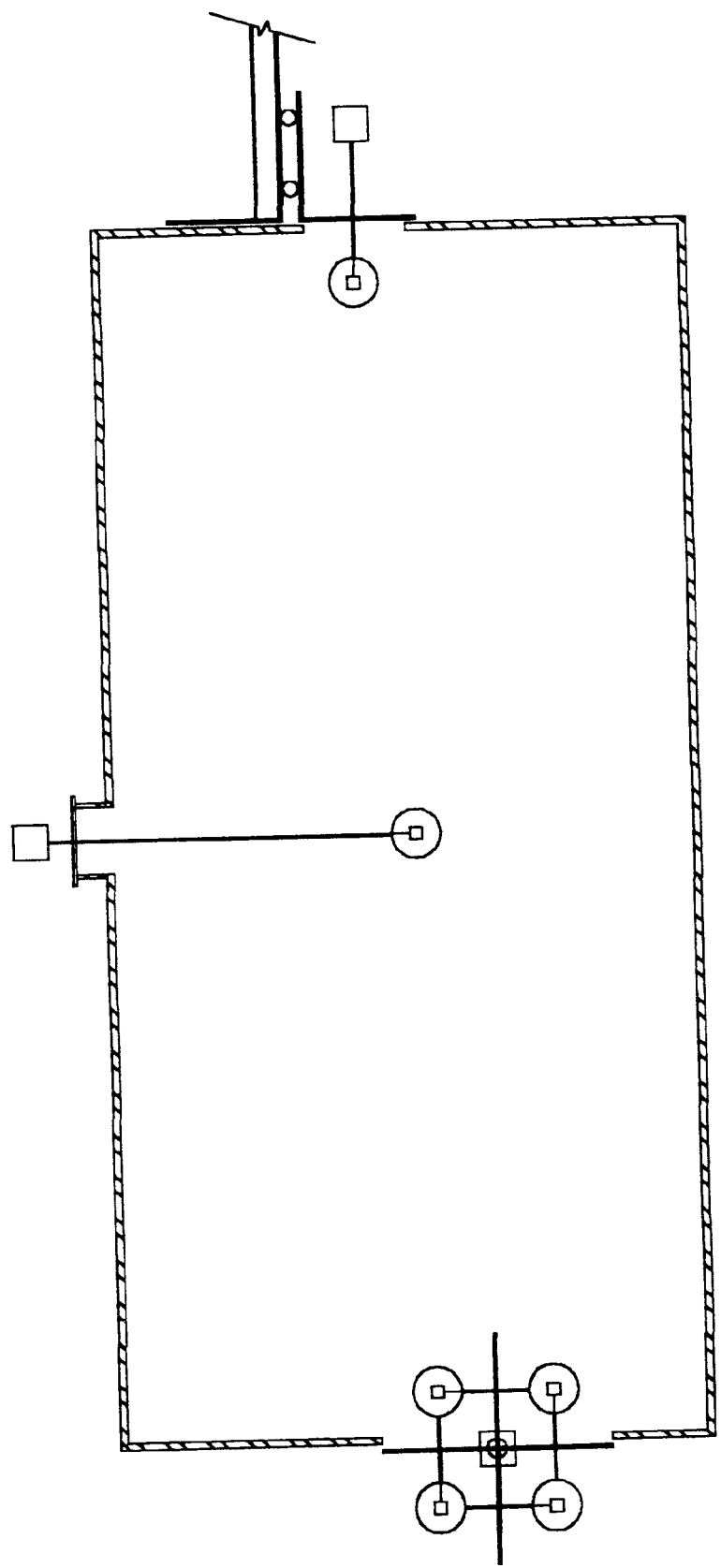
FIG. 8 is enlarged view, taken on line 8—8 of FIG. 1, and which illustrates an array of test modules of the present invention, mounted in a variety of suggested operational positions within a duct.

FIG. 8 illustrates a cross section of the duct 40 which includes an array of test modules 40 of the present invention carried therein in several different manners, for example: revolving assembly 80 illustrates an arrangement where four modules are carried on a central pivot 86, which is suitably supported by a support grid schematically illustrated at 88; extender assembly 84, which includes a probe 96 inserted through a suitable door or port 94 for supporting a module 40 at the unsupported end thereof, and an exterior roller carrier 82, which includes a sliding mechanism 90 for moving the module 40 in and out of the duct.

The actual design of the module support and insertion arrangements can be readily made by any competent designer; however, in all instances, the design must be governed by the requirement that the insertions and removal of the test modules 40 must be simple and, as far as is practical, result in no or very little effect on the operation of the boiler during the operational insertions and removal. It is noted that the arrangements in FIG. 8 are exemplary only and that more or less modules may be required, or desired, at any specific location, and differing or identical support arrangements may be used.

The preferred embodiments described hereinabove are simply exemplary illustration of the invention herein and it is to be understood that other alternatives and embodiments may be made without departing from the spirit and scope of the invention. Accordingly the invention is not to be limited in any manner, except insofar as the clams setforth hereinafter.

What is claimed is:

1. A module for the testing of the effect of $NO_x$ control processes on actual expanded surfaces which are being considered for operational positioning within a primary flue gas stream, intermediate an exhaust gas source and the outlet of an exhaust gas stack therefor, and wherein the module is adapted to be inserted within the primary duct for such a primary flue gas stream, comprising:

a body assembly having upstream and downstream axially spaced open ends thereof;

an expanded surface test insert within said body assembly, which test insert is sized and configured to replicate the structure of such actual expanded surfaces being considered;

flow enhancement means in cooperation with the body assembly; and said flow enhancement means being operable to establish a velocity of the gas stream passing through the test insert, which will replicate an operational velocity of the gas stream passing through the actual expanded surfaces, which operational velocity falls within a range between a selected minimum velocity occurring at fractional source loads, and a selected maximum velocity.

2. A module as specified in claim 1, wherein the $NO_x$ control processes are utilizing a nitrogenous compound to promote $NO_x$ reduction in the primary flue gas stream.

3. A module as specified in claim 2 wherein the expanded test insert incorporates a catalyst to enhance the reduction of $NO_x$ in the presence of a nitrogenous compound.

4. A module as specified in claim 3 including a first signal detecting means in communication with such a module, for receiving a signal from which the degree of $NO_x$ destruction within said test insert may be determined.

5. A module as specified in claim 4, including second signal generating means in communication with such a module, for receiving a signal from which the pressure loss between the inlet and outlet ends of the module can be determined.

6. A module as specified in claim 5, including a third signal generating means in communication with such a module for receiving a signal indicative of the temperature at least of the one inlet and outlet ends of the module.

7. A module as specified in claim 3, including a signal generating means in communication with such a module for receiving a signal indicative of the concentration of ammonia at least adjacent the downstream end of the module.

8. A module as specified in claim 2 wherein such nitrogenous compound is ammonia, and including a discharge means for selectively discharging such ammonia to promote the reduction of $NO_x$ in the vicinity of such catalyst.

9. A module as specified in claim 2, including a signal generating means in communication with such a module for receiving a signal indicative of the concentration of ammonia at least adjacent the downstream end of the module.

10. A module as specified in claim 2, wherein the effects being tested include catalyst degradation over an extended period of time.

11. A module as specified in claim 2, wherein the effects being tested additionally include fouling of the expanded surfaces.

12. A module as specified in claim 1, wherein the structure of the actual expanded surface being considered, is an air preheater heat exchange element, and the module is adapted to be operationally positioned adjacent the air preheater.

13. A module as specified in claim 2 wherein the expanded test insert incorporates a catalyst to enhance the reduction of $NO_x$ in the presence of a ammonia, and downstream therefrom includes a catalyst for promoting the destruction of excess ammonia.

\* \* \* \* \*